US010984559B2

(12) United States Patent
Hunsmann et al.

(10) Patent No.: US 10,984,559 B2
(45) Date of Patent: Apr. 20, 2021

(54) COLOR ENGINE

(71) Applicant: StyleRiser Inc., Bakersfield, CA (US)

(72) Inventors: Margrit Sieglinde Hunsmann, Schwäbisch Gmünd (DE); Mark Hunsmann, Schwäbisch Gmünd (DE); Glen Kenneth Brown, Bakersfield, CA (US)

(73) Assignee: StyleRiser Inc., Bakersfield, CA (US)

( * ) Notice: Subject to any disclaimer, the term of this patent is extended or adjusted under 35 U.S.C. 154(b) by 0 days.

(21) Appl. No.: 16/628,620

(22) PCT Filed: Jul. 2, 2018

(86) PCT No.: PCT/US2018/040631
§ 371 (c)(1),
(2) Date: Jan. 3, 2020

(87) PCT Pub. No.: WO2019/010134
PCT Pub. Date: Jan. 10, 2019

(65) Prior Publication Data
US 2020/0160563 A1 May 21, 2020

Related U.S. Application Data

(60) Provisional application No. 62/528,274, filed on Jul. 3, 2017.

(51) Int. Cl.
*G06K 9/00* (2006.01)
*G06T 7/90* (2017.01)
*G06Q 30/06* (2012.01)
(52) U.S. Cl.
CPC ............ *G06T 7/90* (2017.01); *G06K 9/00268* (2013.01); *G06Q 30/0623* (2013.01); *G06T 2207/10024* (2013.01); *G06T 2207/30201* (2013.01)

(58) Field of Classification Search
CPC ............ G06T 7/90; G06T 2207/10024; G06T 2207/30201; G06K 9/00268;
(Continued)

(56) References Cited

U.S. PATENT DOCUMENTS 8,860,748 B2   10/2014  Campbell et al.
9,064,279 B1 *  6/2015  Tuan ....................... G06F 16/23
(Continued)

FOREIGN PATENT DOCUMENTS

WO       2016183629       11/2016
WO    WO-2016183629 A1    11/2016
(Continued)

OTHER PUBLICATIONS

"International Application Serial No. PCT/US2018/040631, International Search Report dated Sep. 17, 2018", 2 pgs.
(Continued)

*Primary Examiner* — Ali Bayat
(74) *Attorney, Agent, or Firm* — Schwegman Lundberg & Woessner, P.A.

(57) ABSTRACT

Various embodiments described herein provide for a method that comprises: accessing an image representing a face of a user; identifying a base color of the user's face based on the image; matching the base color of the user's face to a color palette based on configured color lookup rules; identifying a product depiction, from a plurality of product depictions stored at an ecommerce server, based on a color of the product being included in the color palette; and causing the display of the product depiction on a user interface.

17 Claims, 16 Drawing Sheets

(58) Field of Classification Search
    CPC ............ G06Q 30/0623; G06Q 30/0621; G01J 2003/466; G01J 2003/467; G01J 3/463; G01J 3/50
    USPC .......................................................... 382/100
    See application file for complete search history.

(56) References Cited

U.S. PATENT DOCUMENTS

| | | | |
|---|---|---|---|
| 9,671,795 B2 | 6/2017 | Igarashi | |
| 2003/0065552 A1* | 4/2003 | Rubinstenn | H04N 5/23206 705/26.7 |
| 2007/0076013 A1 | 4/2007 | Campbell et al. | |
| 2011/0082764 A1 | 4/2011 | Bruck et al. | |
| 2015/0055086 A1* | 2/2015 | Fonte | G02C 13/003 351/178 |
| 2017/0077764 A1* | 3/2017 | Bell | H02J 7/027 |
| 2018/0260871 A1* | 9/2018 | Harvill | G06Q 30/0621 |
| 2019/0014884 A1* | 1/2019 | Fu | G06K 9/00281 |
| 2019/0318505 A1* | 10/2019 | Lasalle | G01J 3/0278 |

FOREIGN PATENT DOCUMENTS

| | | |
|---|---|---|
| WO | 2019010134 | 1/2019 |
| WO | WO-2019010134 A1 | 1/2019 |

OTHER PUBLICATIONS

"International Application Serial No. PCT US2018 040631, Written Opinion dated Sep. 17, 2018", 7 pgs.

"International Application Serial No. PCT/US2018/040631, International Preliminary Report on Patentability dated Jan. 16, 2020", 9 pgs.

"All Eyes on Hue—Portable, Personalized Seasonal Color Match Genius", (c) Apple, Inc. [online]. Retrieved from the Internet: <URL: https://apps.apple.com/us/app/all-eyes-on-hue-portable-personalized-seasonal-color/id939633468>, 2020, 3 pgs.

* cited by examiner

COLOR ENGINE

CLAIM FOR PRIORITY

This application is a U.S. National Stage Filing under 35 U.S.C. 371 from International Application No. PCT/US2018/040631, filed 2 Jul. 2018, and published as WO 2019/010134 A1, which claims the benefit of priority of U.S. Provisional Application No. 62/528,274, filed Jul. 3, 2017, each of which are hereby incorporated by reference in their entirety.

BACKGROUND

In the past, matching clothing with a person's biological color characteristics has been handled through a personal consultation. This process can typically involve draping many colored fabrics over the shoulder of the person being analyzed. These colors are staged in a specific order and for a specific outcome. There has been some work to digitize this process, however the current efforts are very simplistic and do not provide accurate or complete results.

A manual process delivered by a highly trained and experienced color analyst or image consultant, who hands out a physical color palette to be used for the manual/brick-and-mortar shopping experience, is not scalable to the web.

There are a number of cosmetic apps analyzing user's facial complexion based on a selfie image. All of them are connected to the online purchase of cosmetics (one example is an app called 'Plum Perfect'). Those apps attempt to capture tones from certain facial features, but are designed to draw conclusions that are relevant for the cosmetic industry.

AllEyesOnHue is one example product attempting to provide a color analysis approach based on a selfie upload, but is targeted toward assisting a manual/brick-and-mortar shopping experience. U.S. Pat. No. 8,860,748 describes another facial color analysis process.

BRIEF SUMMARY

A system is disclosed that analyzes a digital image of a person's face (e.g., from a selfie) for color and facial features to derive a set of colors and patterns that complement and enhance the person's look when applied to clothing products worn by the person.

The system improves the online shopping experience by analyzing the color content of a user-provided selfie (self image). A product display more appealing to the user is thus presented, increase the likelihood of a purchase.

The system uses software based color analysis to assist with identifying suitable apparel online. Along with the provided color intelligence the system may determine gender, age, and other demographic attributes directly from the provided selfie image. The system reduces the chances of mispurchases or unsuitable apparel selections being presented to the end user. It also reduces the high cost of returns and significantly increases user satisfaction. The system may encourage users to make purchases beyond those including a limited set of colors they perceived as 'safe'.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The disclosed system analyses facial features from a selfie in order to determine user's color signature (best matching colors and to a certain degree, styles) for products like garments, accessories and/or cosmetics.

The preferred mode operates a color analysis engine from an e-commerce website to select clothing colors and enhance the shopping experience and customer satisfaction. An application program interface (API) for the color engine may be made available to e-commerce sites to integrate into and use their existing customer profiles and enhance their customer's shopping experience. This color information output by the color engine may be applied to the design of new clothing that better fits a site's customer base.

The digital color analysis engine has to overcome technical problems such as
- Different smart phone cameras resulting in different picture qualities
- Selfies taken with widely varying light conditions
- Prioritizing various facial spaces or elements
- Capturing the correct color data from selfies
- Dealing with features such as tanning and dyed hair
- Detecting correct color types for users with complex/complicated complexions Once color information is obtained from a selfie, a matching engine has to overcome technical problems such as
- Rendering retailer's products with matching color content
- Matching user's style profile information with retailer's product (color) information
- Rapid display of product representation in correct color, gender, and style.

Figure 1:
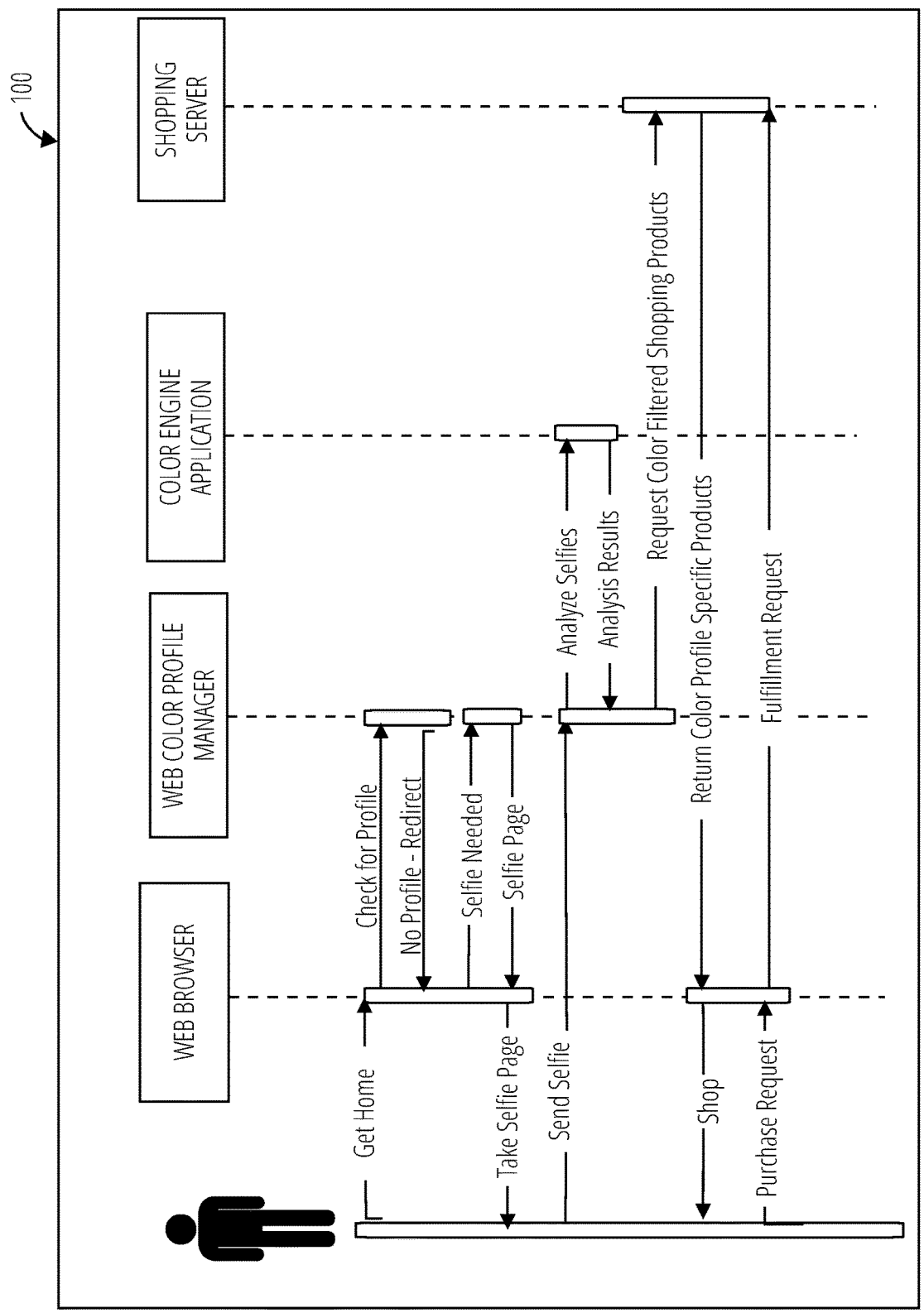
FIG. 1 illustrates an embodiment of a purchase fulfillment process 100 in which a user profile does not exist, or does not include a self-image of the user.

FIG. 1 illustrates an embodiment of a purchase fulfillment process 100. A user of a web service operates a web browser to a home page of the service (e.g., web color profile manager). The service checks for a user profile including a self-image of the user. If no self-image is located, the browser is directed to a web page that prompts the user to take and upload a self-image (i.e., selfie).

The color engine needs a selfie to build a color profile. In some embodiments the system can operate purely from the selfie, and no other personal information is collected or needed. In such "stateless" systems, the color palette generated for the user remains in effect during the user's web session, and is not saved beyond the session. No user profile creation is necessary in this use model (except for information extracted from the selfie for the session).

The user may optionally create a user account (e.g. StyleID) at the web service (e.g., as one provided by StyleRiser Inc.) and save the color palette information. The web service may send a web cookie including the color palette information to the user's computer to be stored by the user's web browser while the user is browsing. The web cookie can then be accessed by e-commerce websites to access the color palette information. This would allow the user to shop in the future at any e-commerce websites that has access to the web cookie without submitting a new selfie. The generated color palette for the user may be saved, but not the selfie image itself.

The selfie is communicated to the service, which operates the color engine application to identify color characteristics of the user from the selfie. The service analyzes these results and requests information on compatible/enhancing wearables from the e-commerce server (coats, shoes, other clothing etc.) This information on products is provided back to the user's web browser, from which they make product selections and place orders.

Figure 2:
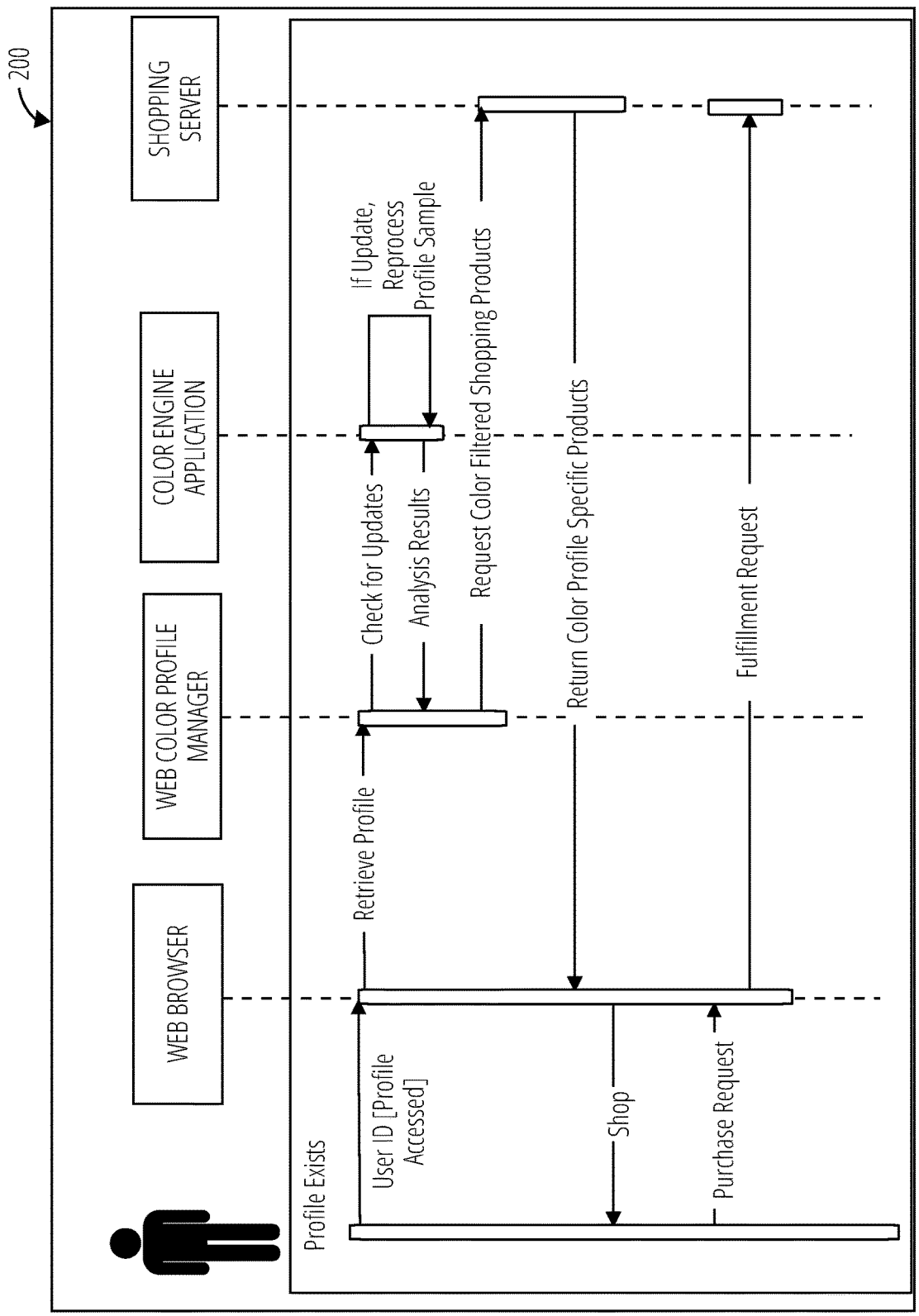
FIG. 2 illustrates an embodiment a purchase fulfillment process 200 in which the user profile already exists, including a selfie.

FIG. 2 illustrates an embodiment of a purchase fulfillment process 200 in which the user profile already exists, including a selfie. The service checks for updates to the selfie and if they exist, reprocesses the updated selfie for color information. Otherwise, the process is similar to the purchase fulfillment process 100 of FIG. 1. The service analyzes these results and requests information on compatible/enhancing wearables from the e-commerce server (coats, shoes, other clothing etc.) This information on products is provided back to the user's web browser, from which they make product selections and place orders.

Figure 3:
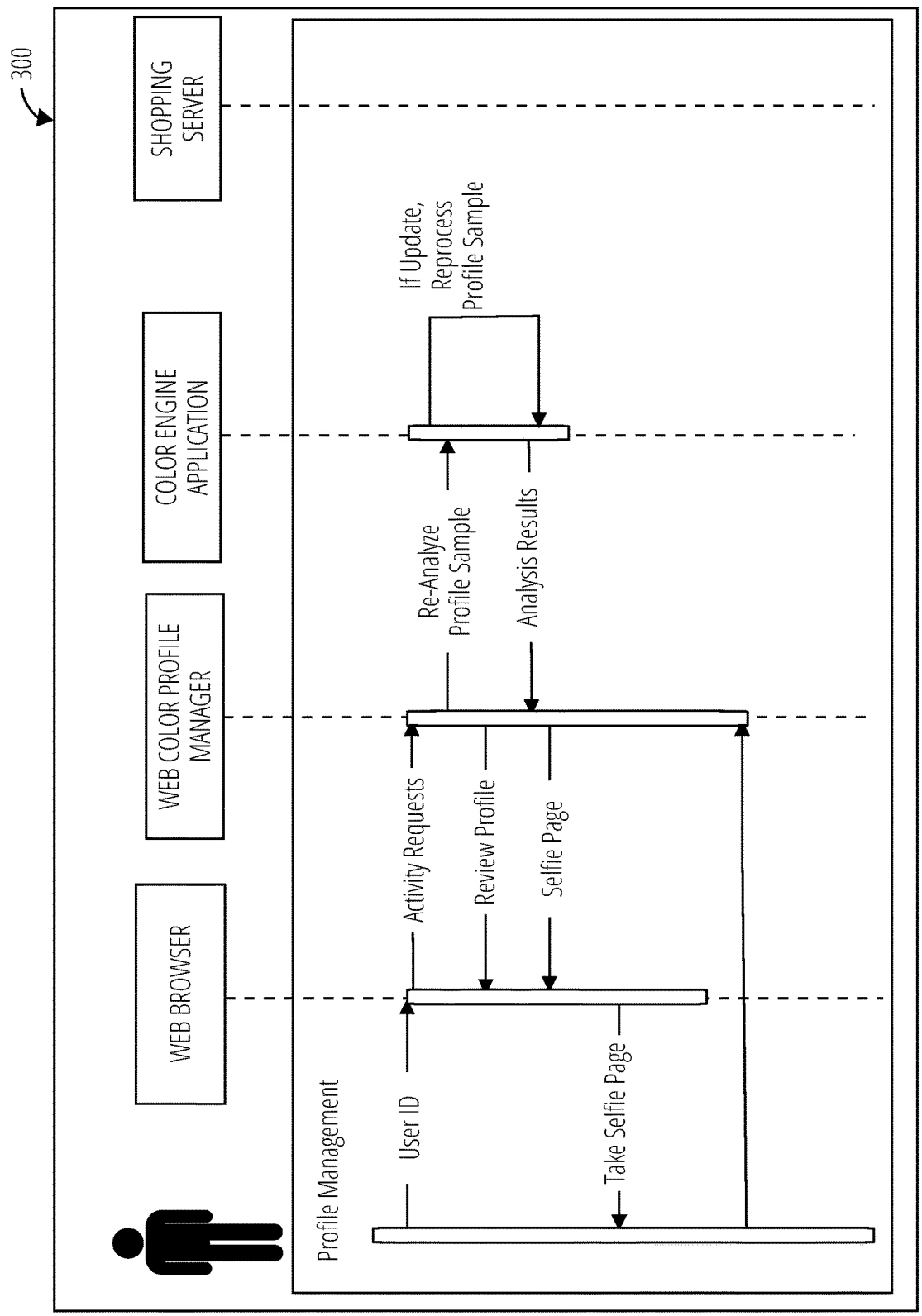
FIG. 3 illustrates an embodiment of a user profile management process 300.

FIG. 3 illustrates an embodiment of a user profile management process 300. The service receives activity requests such as an updated selfie from the user's web browser. The service operates the color engine application to re-analyze the updated selfie and update color characteristics in the user's profile.

Figure 4:
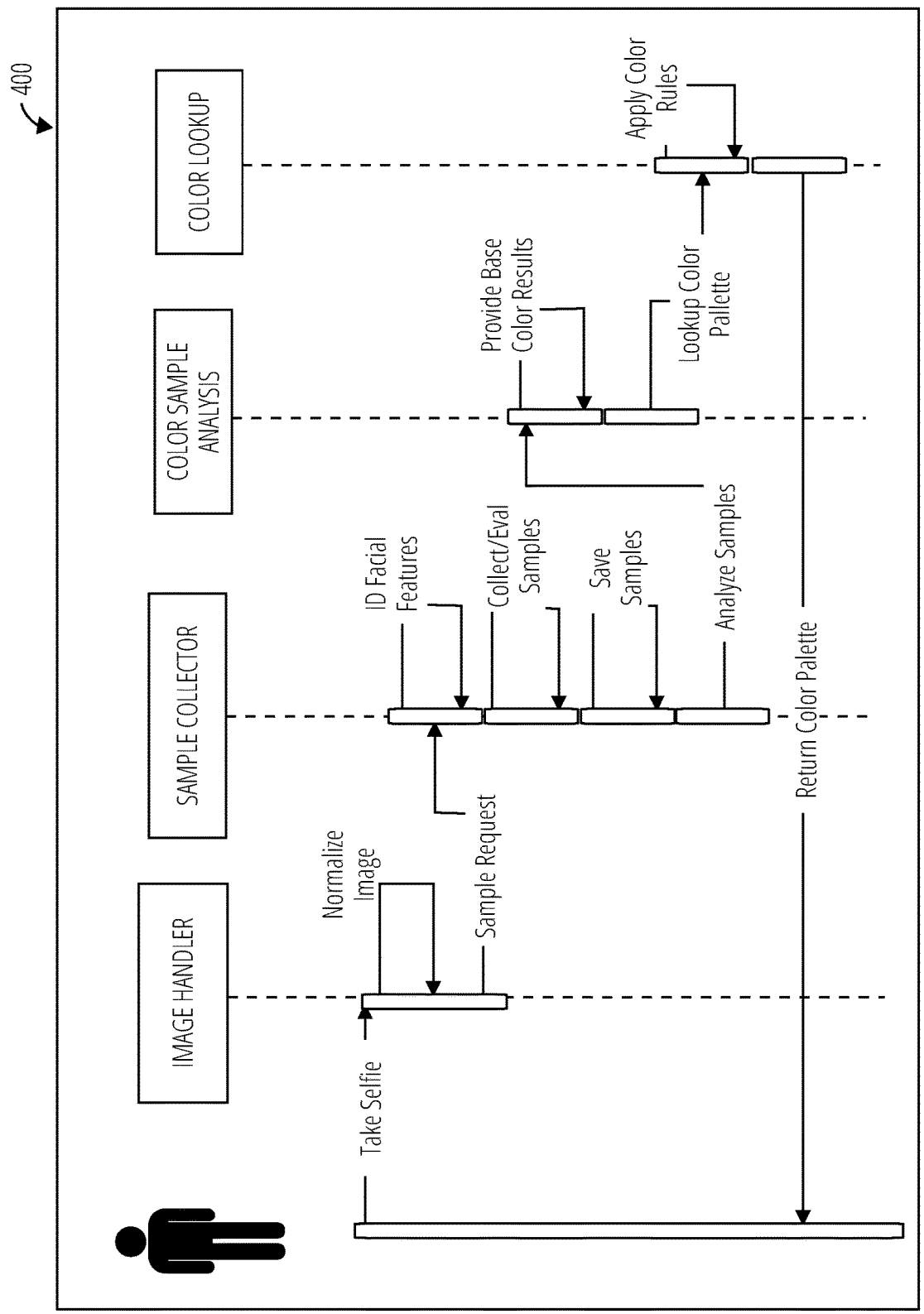
FIG. 4 illustrates an embodiment of a color engine process 400.

FIG. 4 illustrates an embodiment of a color engine process 400. A provided selfie is first normalized (e.g., corrected for glare and other wide-range intensity or color values). Image normalization is well understood in the art. The image is then sampled by sample collection logic which extracts, collects, and saves facial features. These are analyzed for color content by color sample analysis logic, and base color results from the analysis are used to look up a well-matched color palette for the user's face based on configured lookup rules/associations. The determined color palette is returned to the user (e.g., via the user's web browser), and/or is stored in the user's profile.

Normalization may adjust the image toward a more "standard" distribution of colors/intensities regardless of the camera that is used, and a quality index may be created. The index measures whether the image is good enough quality to continue with the process. Products like brightness, color saturation etc. are used/adjusted during the normalization and quality index generation processes. If the image quality is unsatisfactory then the user may be prompted to take another picture and provided tips on how to improve the image.

Identifying facial features may include identifying facial skin areas, hair, eyes, mouth/lips, eyebrows, and beard, if present. Location and angularity of these features may be determined. Results enable the color engine to help with identifying complimentary patterns in clothing.

Once the features are identified sample locations are identified. These locations must provide a minimum number of pixels which are consistent with a normal sample. If that cannot be achieved, then a new location for that feature is selected. If a feature is not available for sampling, the color engine process 400 makes adjustments to the logic and continues.

Once the facial feature locations are identified, color samples are collected from these features. Hair color, skin color, eye color, lip color, and eyebrow color may be sampled individually. Several areas from each feature should be sampled.

Each sample is evaluated statistically to determine if it is homogeneous enough to be typed, or if there are outliers in the sample that need to be removed. Variance within a sample is important and the application will need to have adjustable controls in place to ensure results match the complexity of the feature samples.

A difference or distance between two colors may be measured as a difference in terms of color temperature. The color temperature of a color is the temperature of an ideal black-body radiator that radiates light of that color. Homogeneity of a color sample may also be measured in terms of color temperature. Alternatively, a difference or distance between two colors may also be measured as a distance within a color space, a color space being a specific organization of colors. A color space may be arbitrary, with particular colors assigned to a set of physical color swatches, as the Pantone collection, or structured mathematically, as NCS System, Adobe RGB or sRGB. The difference between two colors can be measured as a Euclidean distance or as a CIELAB Delta E distance. Euclidean distances or CIELAB Delta E distances may also be used to compute an average color of a sample or a color homogeneity of a sample. If a sample is not determined to be suitable quality, a new sample is taken from the same feature area, and the new sample is then evaluated for quality. If a feature is not available for sampling or a clean sample of suitable quality cannot be collected, it is noted and the decision logic is updated.

Once each sample is validated, the sample and statistics about the sample are saved into a database for future reference.

After sample calculations are completed the color engine process 400 continues to a decision matrix where with parameters set based on some of the primary features sampled. The skin and hair color and contrast are primary features, for example. From this information and the decision matrix the color engine process 400 determines base and complimentary colors.

Base colors are the primary color set from which a color profile is built. From the base colors a primary color palette is identified. This is the starting point of a personalized color profile. It has been determined that while some users may not need major adjustments to the primary color palette, most people have many nuances to their facial design which requires some adjustments to be made.

Secondary samples are used to enhance and adjust the generated color palette which may or may not need colors added to or removed from it. Colors can be affiliated with each other based on hue, which then can be added, or removed, from the personalized version of the color profile.

Accessory colors are identified in the process, as well as the suitable metal colors. Contract colors may be added to the personal profile as well. Each person has a unique facial structure which lends itself to different patterns which enhance a person's look. These patterns are identified, in one embodiment, as subtle, obvious and strong.

The personalized color palette is saved into a set of database tables (see the exemplary table schemas in FIGS. 5-8) for use later. If the user chooses to create and account, the account is associated to the color profile. If not, the profile is still saved but with no personal identifiable data, only sample patches of the selfie image and calculated statistics from the image.

The data collected by the color engine process 400 provides the user with insight to aid them in shopping for products which enhance their appearance. Integration of the color engine with a fashion shopping website may thus improve the user's shopping experience. The analysis data also aids when making order from suppliers of fashion. The data may be analyzed to aid designers and buyers for specific labels with information about the composition of shopper colors. This will help ensure designers are meeting the needs of their customers and providing a balance of colors which enhance the customers look and the choices they can make.

Once the data is stored the reference to the color profile is handed back to the service. The handoff data may take a variety of forms depending on the purpose and use of the information. An array of colors, used for matching seller's inventory, could be one form. A reference to the color profile is another possible form.

Figure 5:
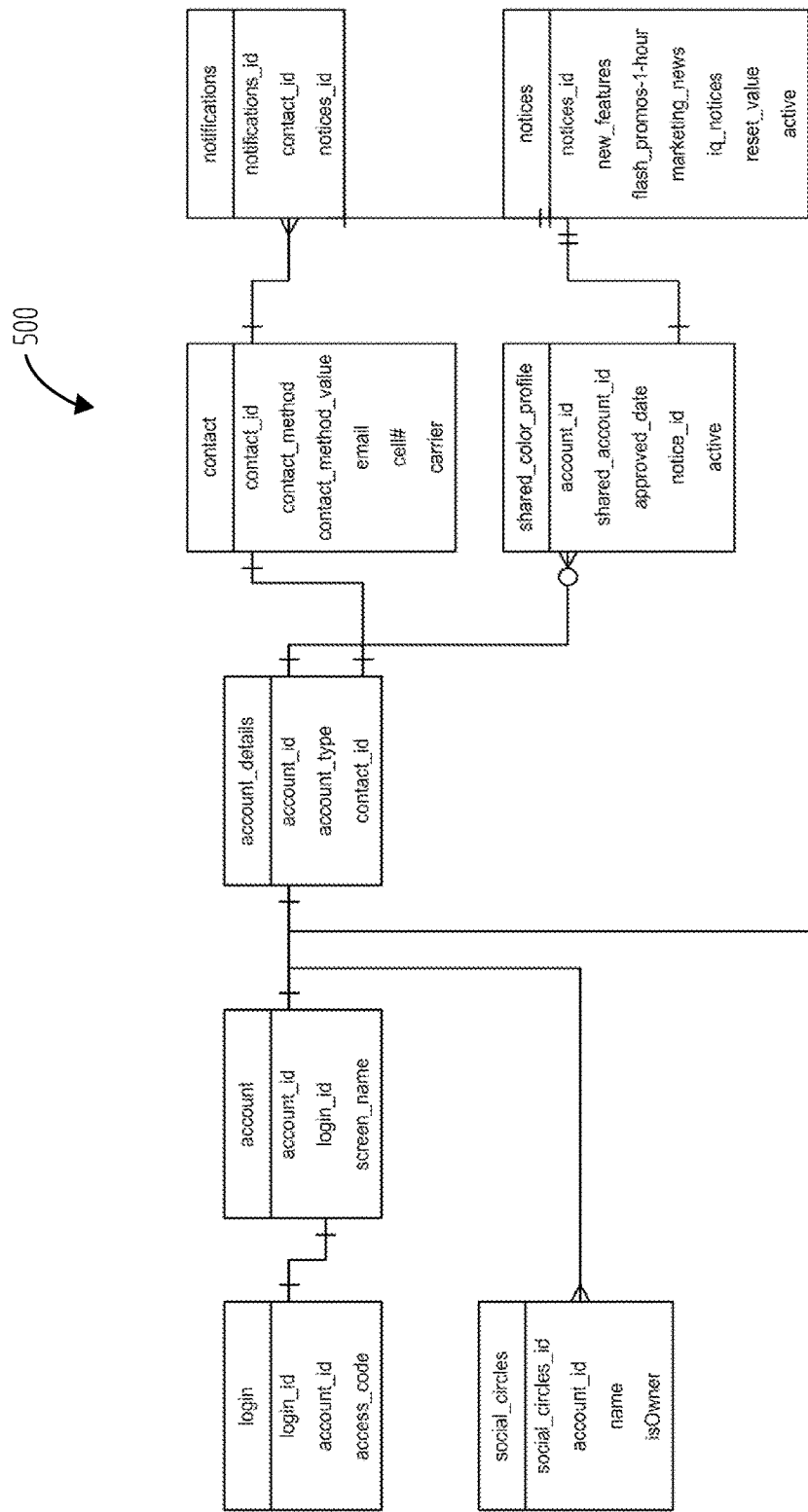
FIG. 5 illustrates a machine memory schema 500 for implementing an embodiment of a color engine.
Figure 6:
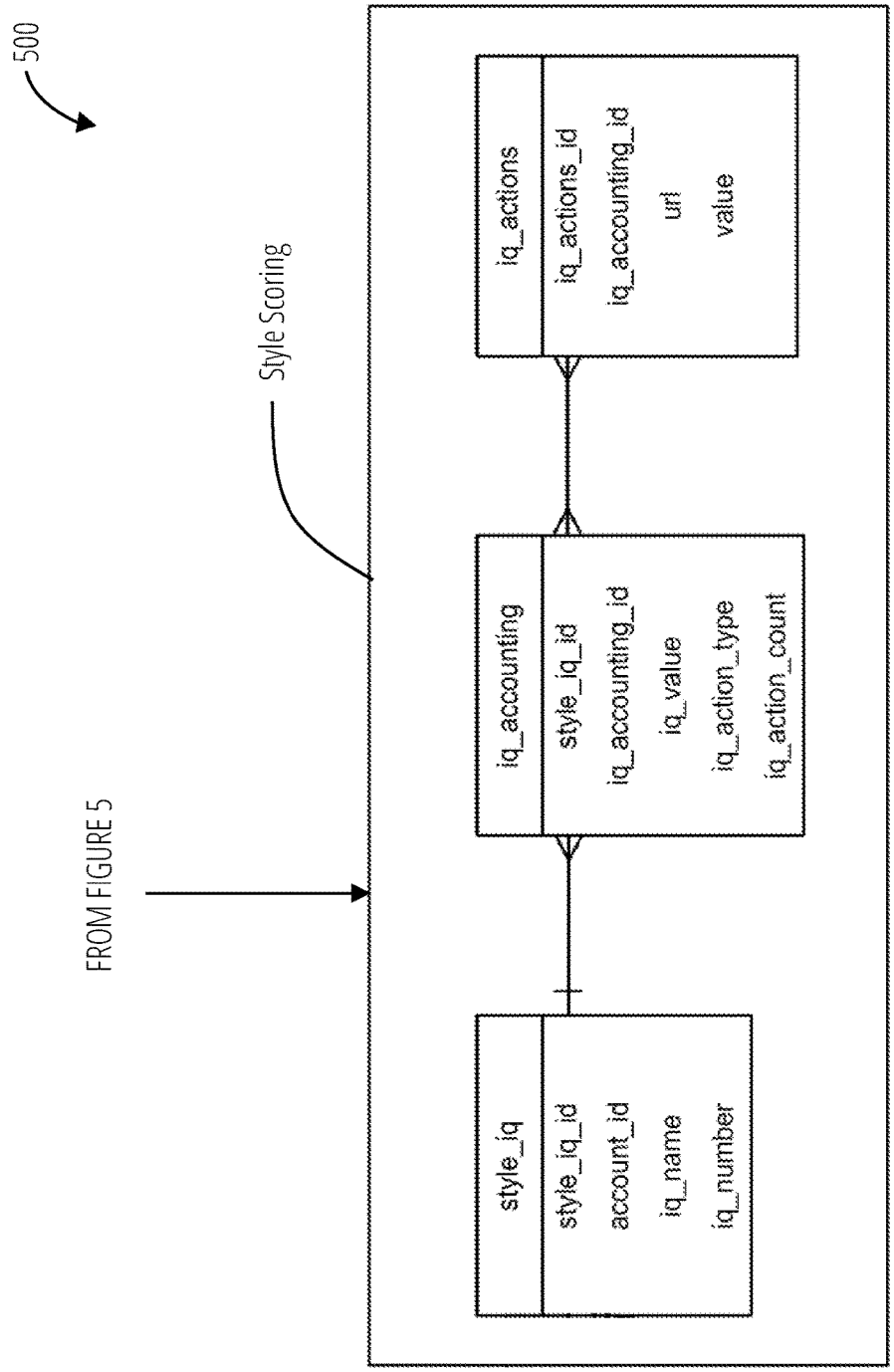
FIG. 6 further illustrates a machine memory schema 500 for implement an embodiment of a color engine.

FIG. 5 and FIG. 6 illustrate a machine memory schema 500 in accordance with implementing an embodiment of a color engine and the processes described above. The machine memory schema 500 enables various functionality of the color engine, such as user authentication (login), utilization of demographics, StyleIQ Points, notifications, social groups, shopping history, and profile sharing.

Figure 7:
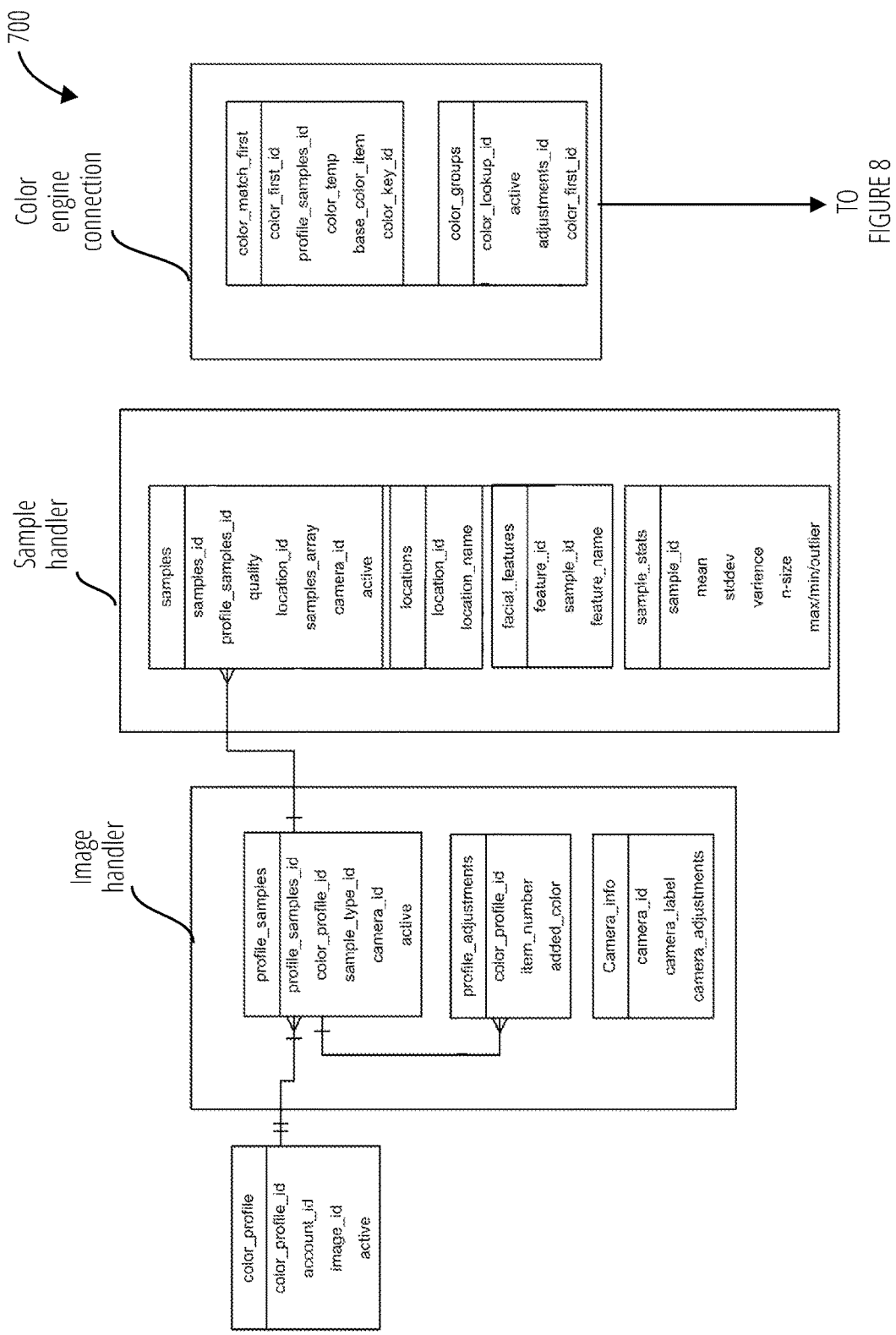
FIG. 7 illustrates a machine memory schema 700 for implementing an embodiment of a color engine.
Figure 8:
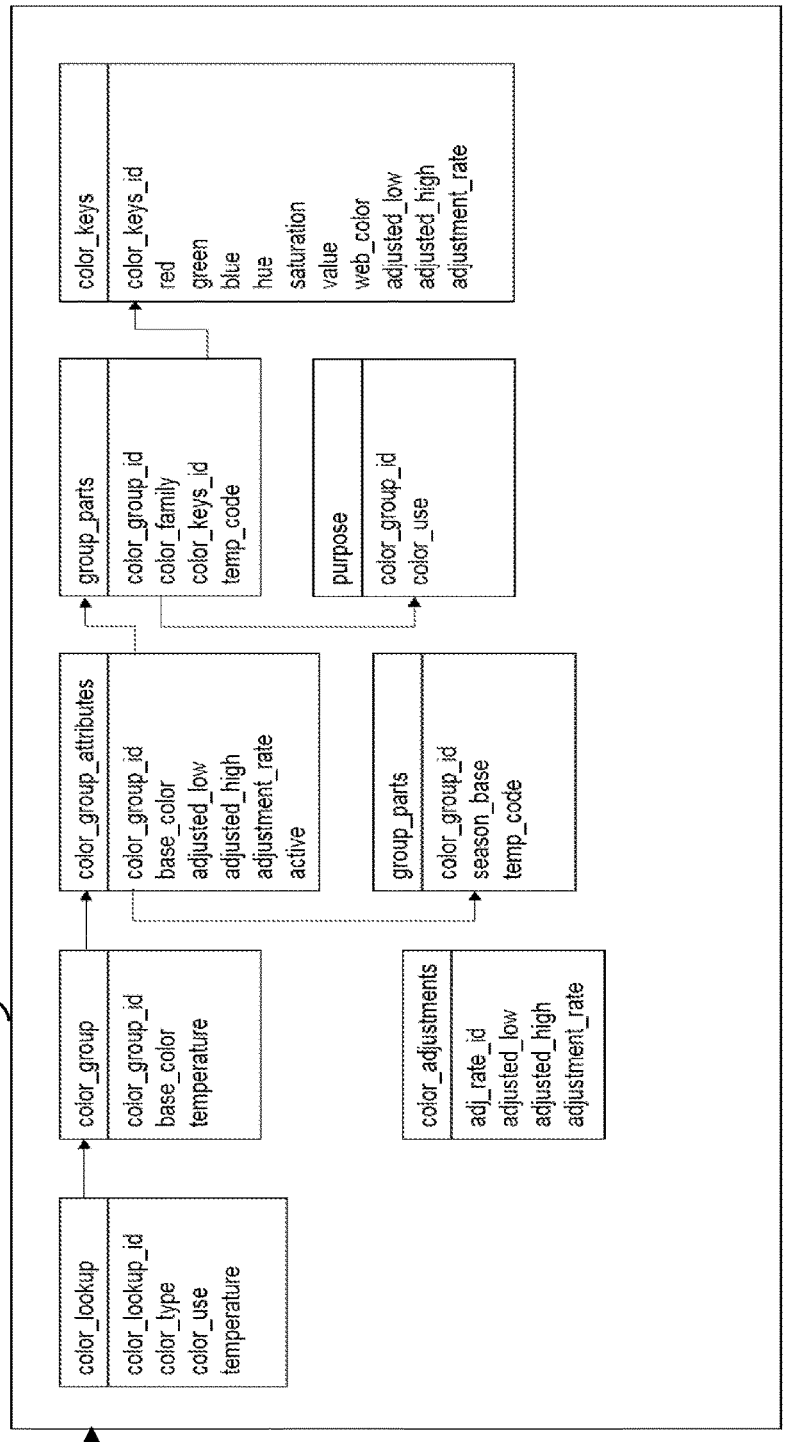
FIG. 8 illustrates additional aspects of a machine memory schema 700 for implementing an embodiment of a color engine.

FIG. 7 and FIG. 8 illustrate a machine memory schema 700 in accordance with implementing an embodiment of a color engine. The machine memory schema 700 enables various functionality of the color engine, such as image and sample handling, and color matching and processing by the color engine.

Example values in the color lookup table (FIG. 8) include neutrals, metals, neons, base, fresh, essential, typical, and deep (types), and warm and cold (temperatures). Example values for the color_use fields include coats, shoes, pants, shirts, and accessories.

Figure 9:
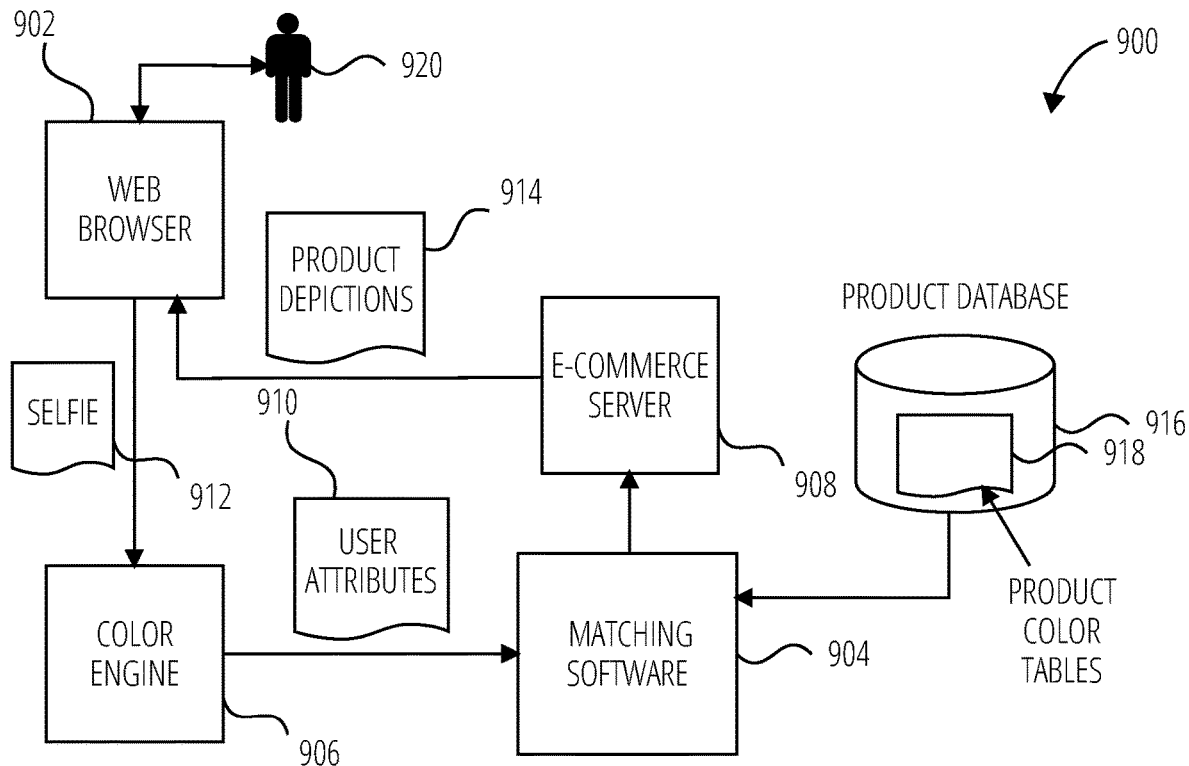
FIG. 9 illustrates an e-commerce system 900 in accordance with one embodiment.

FIG. 9 illustrates an e-commerce system 900 in accordance with one embodiment. The e-commerce system 900 comprises matching software 904, a color engine 906, an e-commerce server 908, and a product database 916.

A user 920 takes a selfie 912 and uploads the selfie 912 to the color engine 906 via the web browser 902. The color engine 906 generates user attributes 910 (color characteristics, age, gender, etc.) from the selfie 912 and communicates the user attributes 910 to the matching software 904.

The matching software 904 inputs the user attributes 910 from the color engine 906 and product color tables 918 from the product database 916 and provides a set of products matching the user attributes 910 (especially regarding color coordination) to the e-commerce server 908. The e-commerce server 908 communicates product depictions 914 of the matching products back to the web browser 902 for consideration and selection by the user 920.

Figure 10:
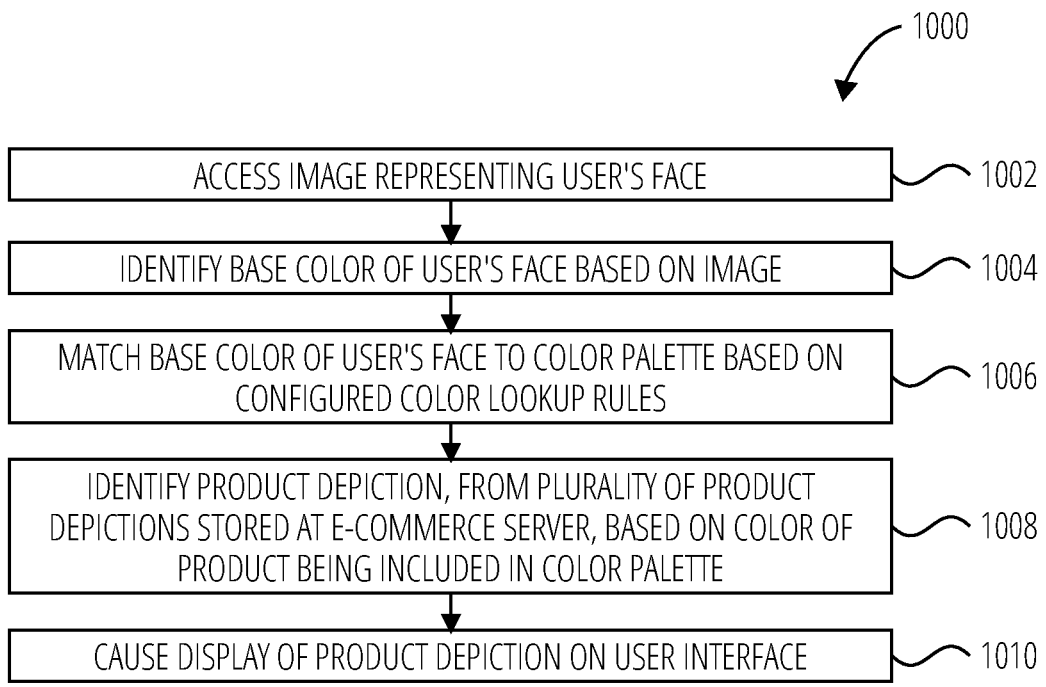
FIGS. 10 to 14 are flowcharts illustrating example methods for recommending products based on a user's color signature, in accordance with various example embodiments.

FIG. 10 is a flowchart 1000 illustrating an example method for recommending products based on a user's color signature, according to an example embodiment. At operation 1002, the color engine 906 accesses an image representing a user's face. At operation 1004, the color engine 906 identifies a base color of the user's face based on the image. At operation 1006, the matching software 904 matches the base color of the user's face to a color palette based on configured color lookup rules. At operation 1008, the matching software 904 accessed the e-commerce server, retrieves a plurality of product depictions 914 stored at the e-commerce server 908, and identifies a product depiction, from the plurality of product depictions 914, based on a color of the product being included in the color palette. At operation 1010, the web browser 902 causes the display of the product depiction on a user interface. The product depiction might be displayed alongside an interactive user element for accessing the e-commerce web site or for directly purchasing the product on the e-commerce web site.

Figure 11:
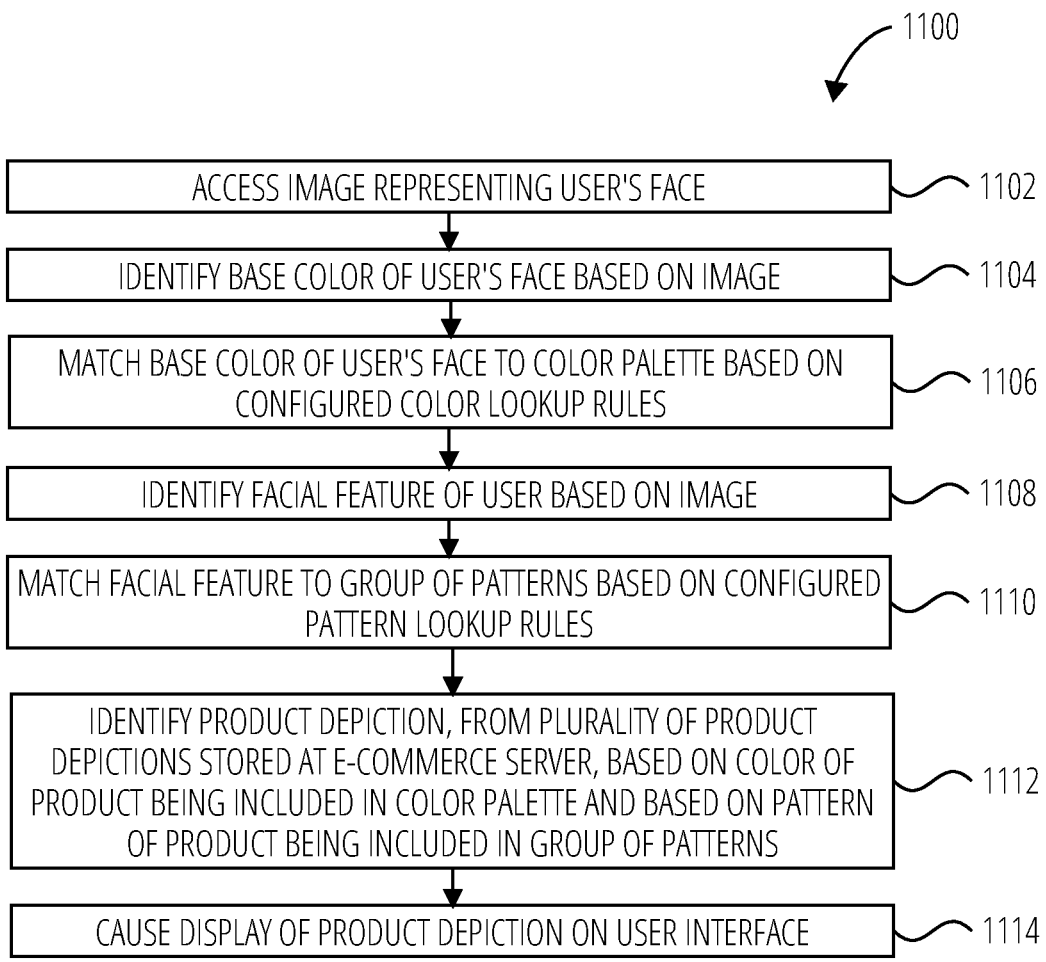

FIG. 11 is a flowchart 1100 illustrating another example method for recommending products based on a user's color signature, according to another example embodiment. In addition to operations 1102, 1104, and 1106 that are similar to operations 1002, 1004, and 1006 and will not be described again, at operation 1108, the color engine 906 identifies a facial feature of the user based on the image. Facial features might include skin areas, hair, eyes, mouth/lips, eyebrows, and beard, if present. At operation 1110, the matching software matches the facial feature to a group of patterns based on configured pattern lookup rules. At operation 1112, the matching software 904 accessed the e-commerce server 908, retrieves a plurality of product depictions stored at an e-commerce server, and identifies one or more product depictions, from the plurality of product depictions, based on a color of the product(s) being included in the color palette, and on a pattern of the product(s) being included in the group of patterns. Operation 1114 is similar to operation 1010 and will not be described again.

Figure 12:
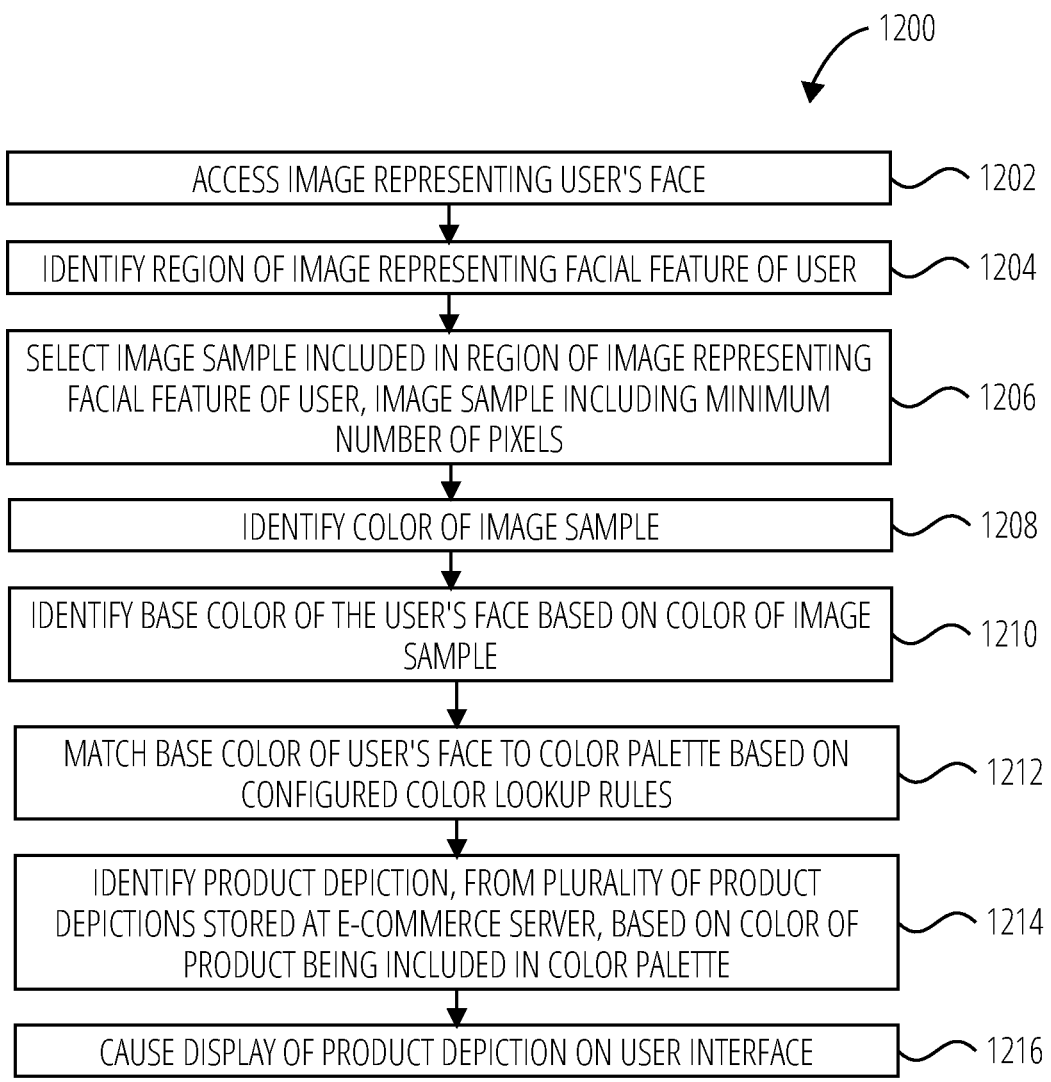

FIG. 12 is a flowchart 1200 illustrating another example method for recommending products based on a user's color signature, according to another example embodiment. In addition to operation 1202 that is similar to operations 1002 and will not be described again, at operation 1204, the color engine 906 identifies a region of the image representing a facial feature. At operation 1206, the color engine 906 selects one or more sample(s) included in the region of the image representing the facial feature, each sample including a minimum number of pixels. At operation 1208, the color engine 906 identifies, for each image sample, a color of the sample based on the color of the pixels of the image sample. At operation 1210, the color engine 906 identifies the base color of the user's face based on the color of the image sample(s). For example, the base color is identified as an average of the colors of the image samples. The average may be weighted based on the number of pixels of each image sample. Operations 1212, 1214, and 1216 are similar to operations 1006, 1008, and 1010 and will not be described again.

Figure 13:
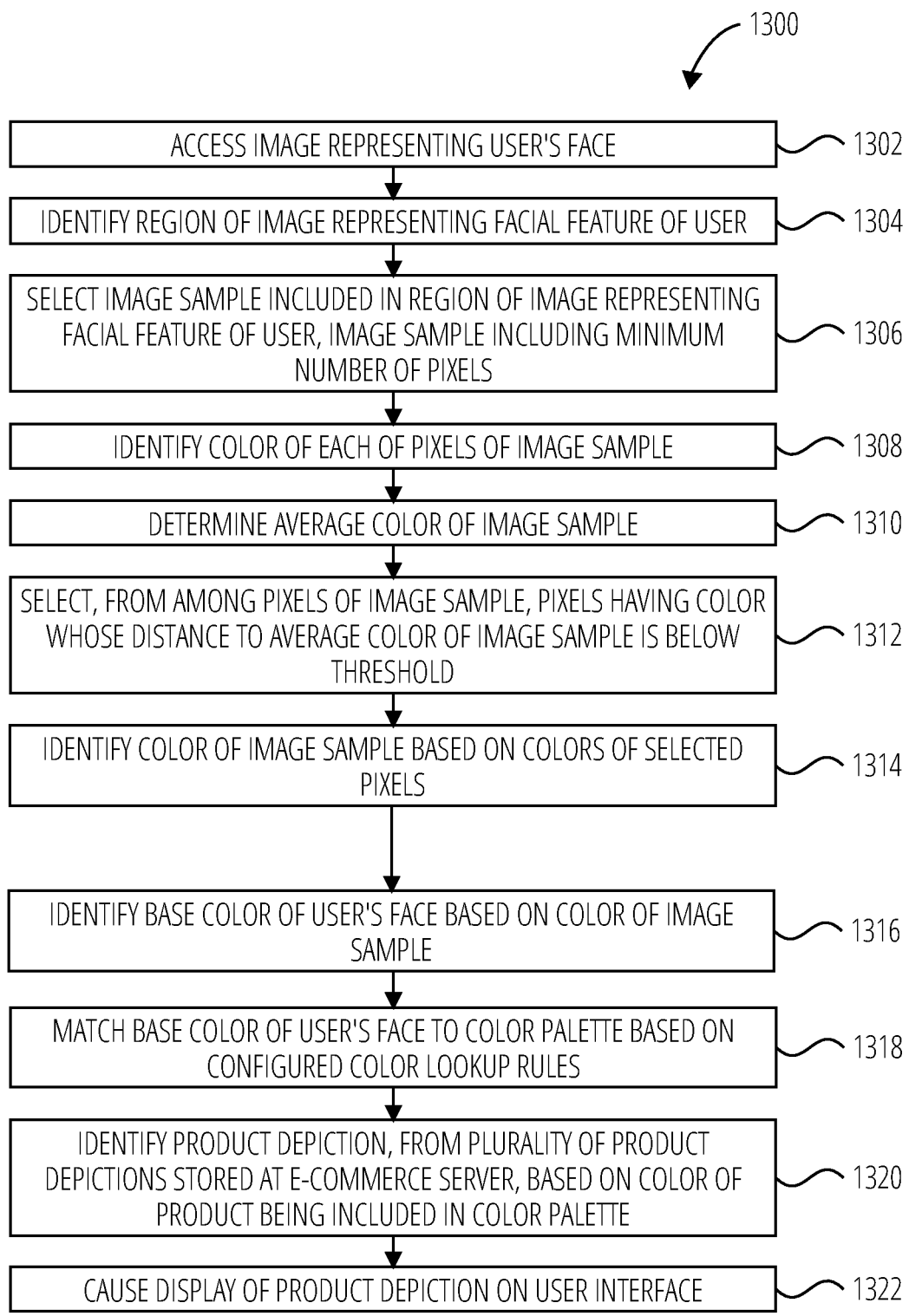

FIG. 13 is a flowchart 1300 illustrating another example method for recommending products based on a user's color signature, according to another example embodiment. In addition to operation 1302 that is similar to operations 1002 and will not be described again, and operations 1304, 1306, 1308 that are respectively similar to operations 1204, 1206, 1208 and will not be described again, at operation 1310, the color engine 906 determines, for each image sample, an average color of the image sample. At operation 1312, the color engine 906 selects, for each image sample, from among the pixels of the image sample, pixels having a color whose distance to the average color of the image sample is below a threshold. At operation 1314, the color engine 906 identifies, for each image sample, a color of the image sample based on the color of the selected pixels of the image sample. At operation 1316, the color engine 906 identifies the base color based on the colors of the image samples. For example, the base color is identified as an average of the colors of the image samples. The average may be weighted based on the number of selected pixels of each image sample. Operations 1318, 1320, and 1322 are similar to operations 1006, 1008, and 1010 and will not be described again.

Figure 14:
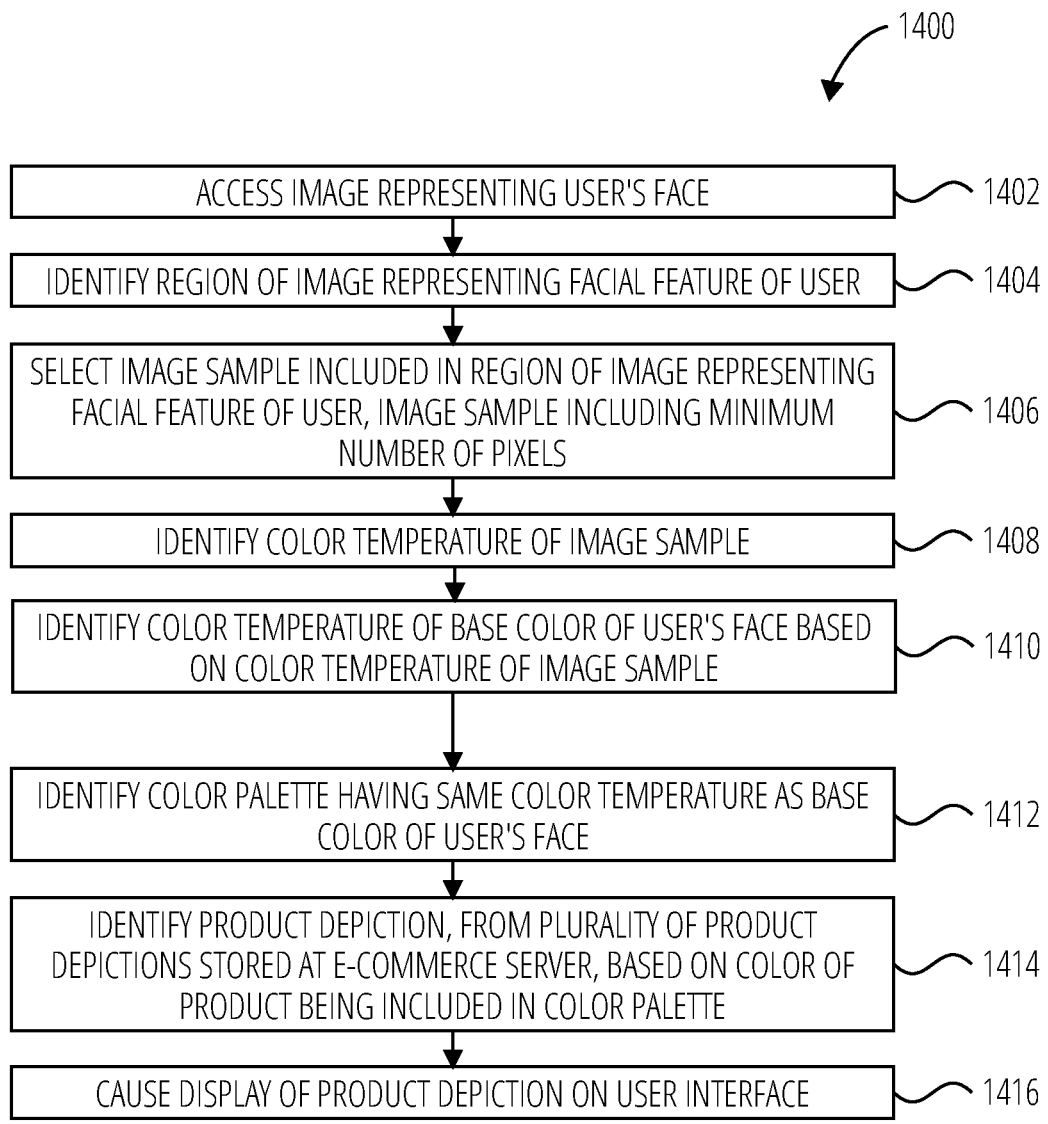

FIG. 14 is a flowchart 1400 illustrating another example method for recommending products based on a user's color signature, according to another example embodiment. In addition to operation 1402 that is similar to operations 1002 and will not be described again, and operations 1404 and 1406 that are respectively similar to operations 2104 and 2106 and will not be described again, the color engine 906 identifies, at operation 1408, a color temperature of each of the image sample(s). At operation 1410, the color engine 906 identifies the color temperature of the base color based on the color temperatures of the image sample(s). For example, color temperature of the base color is identified as an average of the color temperatures of the colors of the image samples. The average may be weighted based on the number of pixels of each image sample. At operation 1412, the color engine 906 matches the base color of the user's face to a color palette by identifying a color palette having the same color temperature as the base color of the user's face. Operations 1414 and 1416 are respectively similar to operations 1008 and 1010 and will not be described again.

Figure 15:
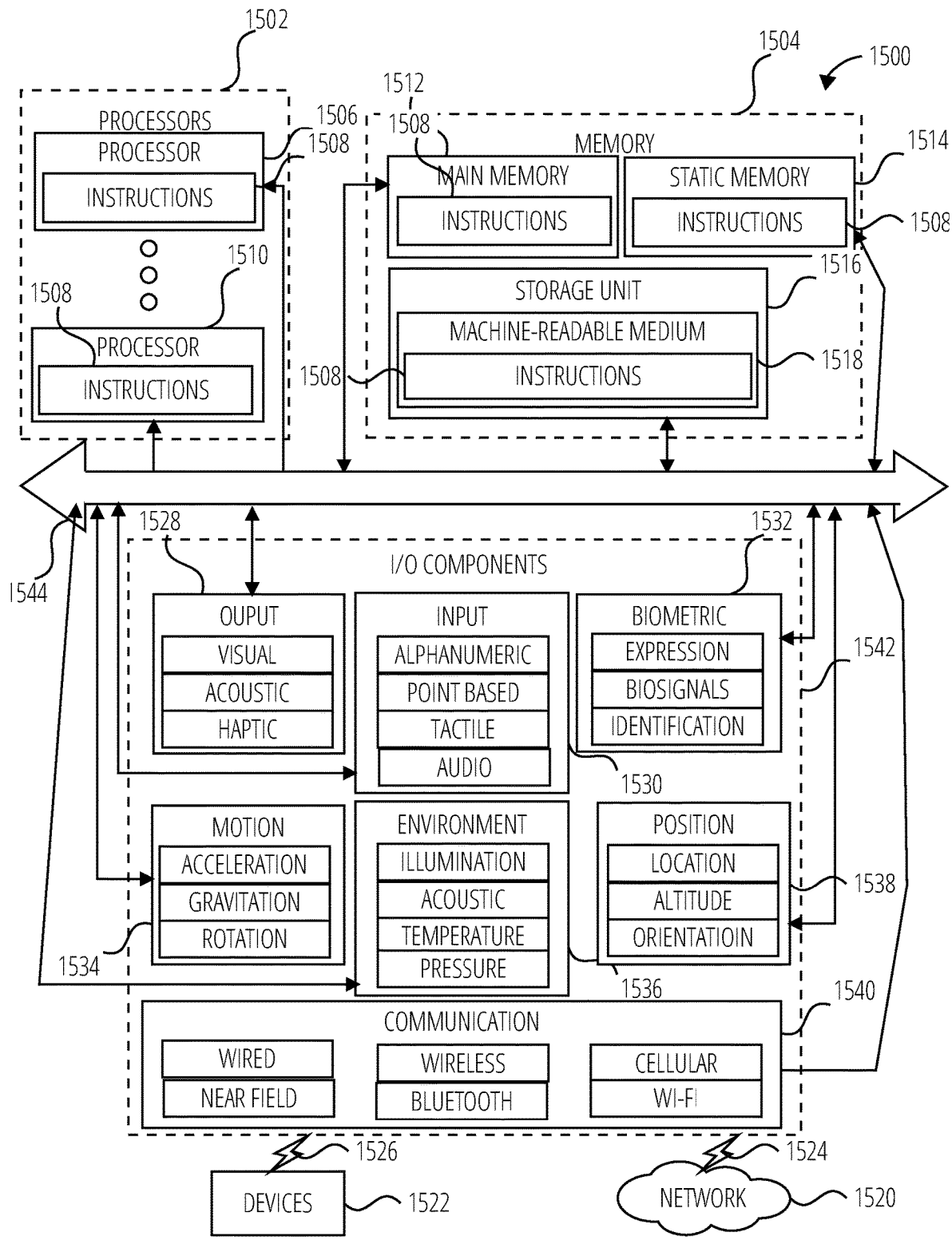
FIG. 15 illustrates a diagrammatic representation of an example machine in the form of a computer system within which a set of instructions may be executed for causing the machine to perform any one or more of the methodologies discussed herein, in accordance with an example embodiment.

FIG. 15 illustrates a diagrammatic representation of a machine 1500 in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute the method XYZ of FIG. 15. Additionally, or alternatively, the instructions 1508 may implement FIGs. X-X, and so forth. The instructions 1508 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machine 1500 that individually or jointly execute the instructions 1508 to perform any one or more of the methodologies discussed herein.

The machine 1500 may include processors 1502, memory 1504, and I/O components 1542, which may be configured to communicate with each other such as via a bus 1544. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that may execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 may include a main memory 1512, a static memory 1514, and a storage unit 1516, both accessible to the processors 1502 such as via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones will likely include a touch input device or other such input mechanisms, while a headless server machine will likely not include such a touch input device. It will be appreciated that the I/O components 1542 may include many other components that are not shown in FIG. 15. The I/O components 1542 are grouped according to functionality merely for simplifying the following discussion and the grouping is in no way limiting. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 may include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1520 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1520 or a portion of the network 1520 may include a wireless or cellular network, and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1508 may be transmitted or received over the network 1520 using a transmission medium via a network interface device (e.g., a network interface component included in the communication components 1540) and utilizing any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1508 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Figure 16:
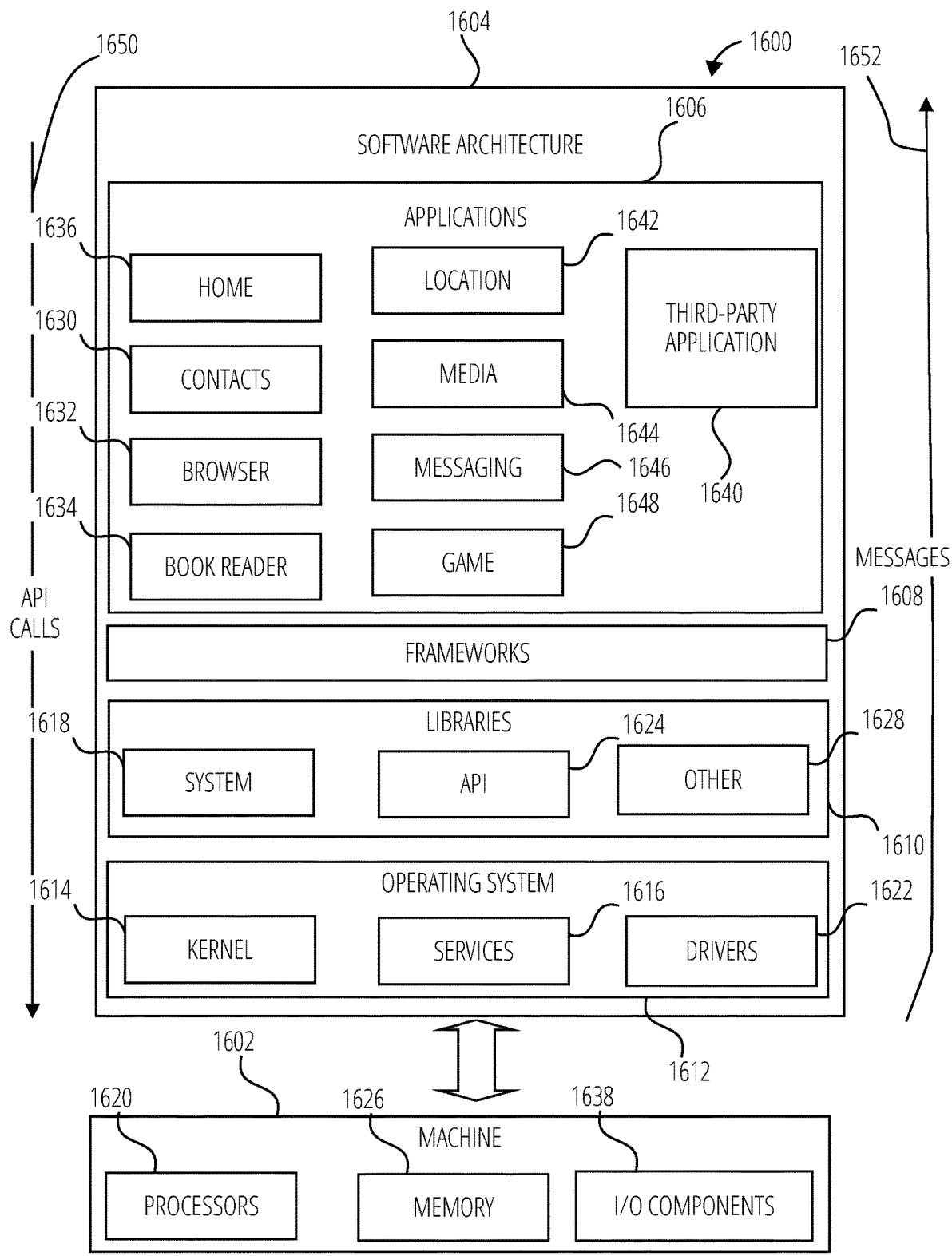
FIG. 16 illustrates a block diagram of an example software architecture.

FIG. 16 is a block diagram 1600 illustrating a software architecture 1604, which can be installed on any one or more of the devices described above. FIG. 16 is merely a non-limiting example of a software architecture, and it will be appreciated that many other architectures can be implemented to facilitate the functionality described herein. In various embodiments, the software architecture 1604 is implemented by hardware such as a machine 1602 of FIG. 2 that includes processors 1620, memory 1626, and I/O components 1638. In this example architecture, the software 102 can be conceptualized as a stack of layers where each layer may provide a particular functionality. For example, the software 102 includes layers such as an operating system 1612, libraries 1610, frameworks 1608, and applications 1606. Operationally, the applications 1606 invoke application programming interface (API) calls 112 through the software stack and receive messages 1652 in response to the API calls 1650, consistent with some embodiments.

In various implementations, the operating system 1612 manages hardware resources and provides common services. The operating system 1612 includes, for example, a kernel 1614, services 1616, and drivers 1622. The kernel 1614 acts as an abstraction layer between the hardware and the other software layers, consistent with some embodiments. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware, according to some embodiments. For instance, the drivers 1622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1610 provide a low-level common infrastructure used by the applications 1606. The libraries 1610 can include system libraries 1618 (e.g., C standard library) that can provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a high-level common infrastructure that can be use by the applications 1606, according to some embodiments. For example, the frameworks 1608 provide various graphic user interface (GUI) functions, high-level resource management, high-level location services, and so forth. The frameworks 1608 can provide a broad spectrum of other APIs that can be use by the applications 1606, some of which may be specific to a particular operating system or platform.

In an example embodiment, the applications 1606 include a home application 1636, a contacts application 1630, a browser application 1632, a book reader application 1634, a location application 1642, a media application 1644, a messaging application 1646, a game application 1648, and a broad assortment of other applications such as a third-party application 1640. According to some embodiments, the applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

The invention claimed is:
1. A method comprising:
accessing image data, in a database, representing an image of a face of a user;
using at least one processor, automatically identifying a base color of the face based on the image data, the identifying of the base color comprising:

identifying a region of the image representing a facial feature of the user;
selecting a plurality of image samples included in the region of the image representing the facial feature of the user, each image sample in the plurality of image samples including a minimum number of pixels; and
identifying a color temperature of each image sample in the plurality of image samples, the base color being identified based on one or more colors identified for image samples in the plurality of image samples;
using the at least one processor, automatically matching the base color of the face to a color palette based on a configured color lookup rule;
identifying a product depiction, from a plurality of product depictions stored in product database, based on a color of the product depiction being included in the color palette; and
causing display of the product depiction on a user interface.

2. The method of claim 1, further comprising:
matching the facial feature to a plurality of patterns based on configured pattern lookup rules, the product depiction being identified further based on a pattern of the product depiction being included in the plurality of patterns.

3. The method of claim 1, wherein the base color is identified as an average of the one or more colors identified for the image samples in the plurality of image samples.

4. The method of claim 1, further comprising, for each particular image sample in the plurality of image samples:
determining an average color temperature of the particular image sample; and
selecting, from among pixels of the particular image sample, pixels having a color whose distance from an average color of the particular image sample is below a threshold, a color of the particular image sample being identified based on the colors of the selected pixels.

5. The method of claim 4, wherein the color of the particular image sample is identified as an average of the colors of the selected pixels.

6. The method of claim 1, wherein the identifying the base color of the face comprises identifying a second color temperature of the base color of the face, and the automatic matching of the base color of the face to the color palette being based on the configured color lookup rule comprises identifying the color palette having a third color temperature corresponding to the second color temperature of the base color of the face.

7. The method of claim 6, further comprising:
identifying a color temperature of each of the image samples of the plurality of image samples; and
identify the second color temperature of the base color of the face based on one or more color temperatures identified for the image samples in the plurality of image samples.

8. A computing apparatus, the computing apparatus comprising:
at least one processor; and
a memory storing instructions that, when executed by the processor, configure the apparatus to:
access image data, in a database, representing an image of a face of a user;
using the at least one processor, automatically identify a base color of the face based on the image data, the identifying of the base color comprising:
identify a region of the image representing a facial feature of the user;
select a plurality of image samples included in the region of the image representing the facial feature of the user, each image sample in the plurality of image samples including a minimum number of pixels; and
identify a color temperature of each image sample in the plurality of image samples, the base color being identified based on one or more colors identified for image samples in the plurality of image samples;
using the at least one processor, automatically match the base color of the face to a color palette based on a configured color lookup rule;
identify a product depiction, from a plurality of product depictions stored in product database, based on a color of the product depiction being included in the color palette; and
cause display of the product depiction on a user interface.

9. The computing apparatus of claim 8, wherein the instructions further configure the apparatus to:
match the facial feature to a plurality of patterns based on configured pattern lookup rules, the product depiction being identified further based on a pattern of the product depiction being included in the plurality of patterns.

10. The computing apparatus of claim 8, wherein the base color is identified as an average of the one or more colors identified for the image samples in the plurality of image samples.

11. The computing apparatus of claim 8, wherein the instructions further configure the apparatus to, for each particular image sample in the plurality of image samples:
determine an average color temperature of the particular image sample; and
select, from among pixels of the particular image sample, pixels having a color whose distance from an average color of the particular image sample is below a threshold, a color of the particular image sample being identified based on the colors of the selected pixels.

12. The computing apparatus of claim 11, wherein the color of the particular image sample is identified as an average of the colors of the selected pixels.

13. The computing apparatus of claim 8, wherein the identifying of the base color of the face comprises identifying a second color temperature of the base color of the face, and the automatic matching of the base color of the face to the color palette being based on the configured color lookup rule comprises identifying the color palette having a third color temperature corresponding to the second color temperature of the base color of the face.

14. The computing apparatus of claim 13, wherein the instructions further configure the apparatus to:
identify a color temperature of each of the image samples of the plurality of image samples; and
identify the second color temperature of the base color of the face based on one or more color temperatures identified for the image samples in the plurality of image samples.

15. A non-transitory computer-readable storage medium, the computer-readable storage medium including instructions that when executed by a computer, cause the computer to:
access image data, in a database, representing an image of a face of a user;

using at least one processor, automatically identify a base color of the face based on the image data, the identifying of the base color comprising:
    identify a region of the image representing a facial feature of the user;
    select a plurality of image samples included in the region of the image representing the facial feature of the user, each image sample in the plurality of image samples including a minimum number of pixels; and
    identify a color temperature of each image sample in the plurality of image samples, the base color being identified based on one or more colors identified for image samples in the plurality of image samples;
using the at least one processor, automatically match the base color of the face to a color palette based on a configured color lookup rule;
identify a product depiction, from a plurality of product depictions stored in product database, based on a color of the product depiction being included in the color palette; and
cause display of the product depiction on a user interface.

16. The computer-readable storage medium of claim 15, wherein the instructions further configure the computer to:
    match the facial feature to a plurality of patterns based on configured pattern lookup rules, the product depiction being identified further based on a pattern of the product depiction being included in the plurality of patterns.

17. The computer-readable storage medium of claim 15, wherein the base color is identified as an average of the one or more colors identified for the image samples in the plurality of image samples.

* * * * *

UNITED STATES PATENT AND TRADEMARK OFFICE
CERTIFICATE OF CORRECTION

| | | |
|---|---|---|
| PATENT NO. | : 10,984,559 B2 | Page 1 of 1 |
| APPLICATION NO. | : 16/628620 | |
| DATED | : April 20, 2021 | |
| INVENTOR(S) | : Hunsmann et al. | |

It is certified that error appears in the above-identified patent and that said Letters Patent is hereby corrected as shown below:

In the Claims

In Column 14, Line 67, in Claim 15, delete "user:" and insert --user;-- therefor Signed and Sealed this
Twentieth Day of July, 2021

Drew Hirshfeld
*Performing the Functions and Duties of the
Under Secretary of Commerce for Intellectual Property and
Director of the United States Patent and Trademark Office*